United States Patent [19]

Mills, Jr. et al.

[11] Patent Number: 4,805,098
[45] Date of Patent: Feb. 14, 1989

[54] WRITE BUFFER

[75] Inventors: Marvin A. Mills, Jr., Sunnyvale, Calif.; Lester M. Crudele, Groton, Mass.

[73] Assignee: MIPS Computer Systems, Inc., Sunnyvale, Calif.

[21] Appl. No.: 860,304

[22] Filed: May 5, 1986

[51] Int. Cl.⁴ .......................... G06F 13/00; G06F 7/00
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 3,449,724 | 6/1969 | Boland | 340/172.5 |
| 4,291,370 | 9/1981 | Charles | 364/200 |
| 4,347,567 | 8/1982 | DeTar | 364/200 |
| 4,426,681 | 1/1984 | Bacot et al. | 364/200 |
| 4,688,188 | 8/1987 | Washington | 364/900 |

Primary Examiner—Thomas M. Heckler
Assistant Examiner—Kevin A. Kriess
Attorney, Agent, or Firm—Kenyon & Kenyon

[57] ABSTRACT

Apparatus is disclosed for buffering writes from a CPU to main memory, in which sequential write requests to the same address are gathered and combined into a single write request. The embodiment described does not permit gathering with the write request in the buffer which is next scheduled for action by the main memory bus controller, nor does it permit gathering with other than the immediately preceding write request. The invention is implemented using a plurality of buffer ranks, each comprising a data rank, an address rank, and a valid rank for indicating which bits or bytes of the data rank contain data to be written to memory.

9 Claims, 3 Drawing Sheets

WRITE BUFFER

BACKGROUND OF THE INVENTION

1. Field of Invention

This invention relates to computer systems, and more particularly to apparatus for buffering data writes from a CPU to a memory subsystem.

2. Description of Related Art

A typical computer system is divided into several subsystems, including a central processing unit (CPU) for executing instructions, and a memory subsystem for holding instructions and data. The CPU obtains information from the memory by issuing a read request, and writes information to memory by issuing a write request. If the memory is fast enough, either type of memory access request is executed immediately. The request is completed by the time the CPU is ready to continue its work. In many computers, however, the memory subsystem is not as fast as the CPU. That is, once the CPU issues a memory access request, it must enter a wait state or stall state for the request to be completed before proceeding. The problem appears frequently with highly pipelined CPUs, such as those that are used in many reduced instruction set computers (RISCs). In these CPUs, several cycles of a very fast clock may pass between the time an instruction enters the pipe to the time its execution is completed, but a new instruction must be fetched and/or a new memory access request is issued on every cycle of that very fast clock.

Many computers reduce the severity of this problem by implementing memory in two levels: a large, relatively slow but inexpensive main memory, and a small, fast cache memory. A cache memory takes advantage of the "principle of temporal locality," i.e., the property inherent in most computer programs wherein a memory location referenced at one point in time is very likely to be referenced again soon thereafter. In a cache-based computer architecture, the CPU first attempts to find needed instructions and data in the cache, which is fast enough to maintain pace with the CPU. Only if the information is not in the cache is a read request issued to main memory. When the requested information arrives, it is both provided to the CPU and written into the cache (overwriting some previous entry) for potential future use. On a data write from the CPU, either the cache or main memory or both may be updated, it being understood that flags may be necessary to indicate to one that a write has occurred in the other. The use of a cache memory improves the overall throughput of the computer because it significantly reduces the number of wait states which the CPU must enter. Wait states are still necessary, however, when an access to main memory is required.

The speed of a main memory read request is critical to the throughput of a computer system because the CPU in most designs cannot continue operating until the requested information is received. It has been recognized, however, that the speed of a memory write request is not as critical. The CPU no longer needs the data once it is sent out to main memory, and unless the data is needed by some other device which shares main memory, there is in theory no reason why the data need actually be written until the next time the CPU issues a request for it. This can be used to advantage by inserting a write buffer subsystem in the bus between the CPU and main memory. Such a subsystem passes read requests to the memory immediately, but passes write requests to the memory only when the bus is not already in use. Write requests are instead buffered in an internal buffer and held until the bus is available. A write buffer subsystem typically includes logic to determine whether any arriving memory read request is requesting data still in the write buffer. If so, these systems temporarily halt the CPU while the write buffer subsystem executes the conflicting write request and all those preceeding it in the buffer. A write buffer subsystem typically also generates a buffer full signal to prevent the CPU from issuing a write request when the subsystem cannot accept it.

In many computers, instructions or data may be fetched or stored in units smaller than a full word. Thus, if a computer system is designed around a 32-bit word, the CPU (or another device sharing access to memory) may be able to issue fetch or write commands for individual 16-bit halfwords or even 8-bit bytes. Computers having this flexibility may be improved by a different method. U.S. Pat. No. 4,347,562 describes apparatus for buffering 16-bit data units arriving from a peripheral device for writing to a 32-bit wide memory. The apparatus comprises means for holding the first 16-bit data unit and destination address received from the peripheral device. Before writing the data into memory, the apparatus waits for the arrival of a second address-data pair and determines whether the two addresses are in a single memory word. If they are, the apparatus writes the first and second data units into the memory at the same time. If the two addresses are not in the same memory word, then the apparatus writes the first data unit to memory and holds the second address-data pair for possible combination with the third address-data pair yet to be received from the peripheral device.

U.S. Pat. No. 3,449,724 describes another buffering scheme, this one for buffering both reads and writes to an interleaved memory system. The scheme described therein, among other things, recognizes when two buffered memory access requests are directed to the same memory location, and chains them together for execution with a single memory select operation. This scheme should reduce the time needed to access a busy interleaved memory module.

SUMMARY OF THE INVENTION

It is an object of the present invention to improve bus usage in a computer system.

It is another object of the present invention to improve the buffering of write commands to main memory.

It is another object of the present invention to provide apparatus for gathering bytes of data to be written to the same memory address.

It is another object of the present invention to provide a method for reducing the bus time needed to perform memory writes by gathering sequential write commands to the same memory address and performing them simultaneously.

In accordance with the invention, a write buffer subsystem is inserted between the CPU and main memory. The write buffer subsystem accepts address-data pairs from the CPU and places them in the first level or rank of an internal buffer having a plurality of ranks. It then issues a request to a main memory bus controller, informing it that a data set is available for writing into main memory. When the bus is free, the controller enables the data set onto the bus and causes the write to take place. When the write is completed, the controller acknowledges its use of the information and awaits another request from the write buffer subsystem.

If the write buffer subsystem receives two write commands from the CPU in sequence, both of which reference the same memory word address, the subsystem will gather these commands into a single buffer rank so that they may both be executed in a single access to main memory. Write commands are not gathered, however, if it would mean altering the write command in the buffer rank currently awaiting execution by the bus controller. Nor are non-sequential write commands gathered. Both of these limitations significantly reduce the complexity of the logic needed to implement the write buffer subsystem without significantly degrading the improved bus usage obtained by gathering. Additionally, by preventing gathering of non-sequential write commands, the software is able to write information to the same address twice in a short time frame, if desired, by issuing an intervening write command to a dummy address. The write buffer subsystem also includes means to signal to the CPU a buffer full condition, and provides a signal useful for detecting the issuance of a memory read command to an address for which a write command is pending.

BRIEF DESCRIPTION OF THE DRAWINGS

The invention will be described with respect to particular embodiments thereof, and reference will be made to the drawings, in which.

DETAILED DESCRIPTION

Figure 1:
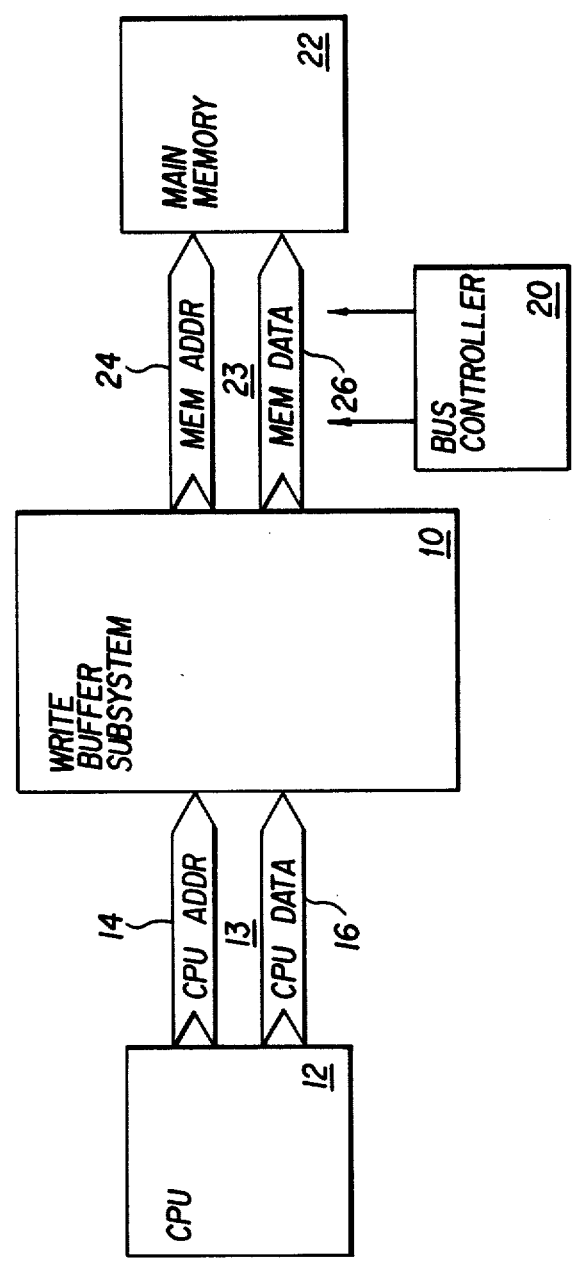
FIG. 1 is a block diagram of a computer incorporating a write buffer subsystem according to the invention.

FIG. 1 shows relevant portions of a computer system, including a CPU 12, a write buffer subsystem 10 according to the invention, and a main memory 22. The general architecture of the computer system is such that individual 8-bit bytes, 16-bit halfwords, 24-bit tribytes, or 32-bit words may be accessed in main memory 22. The CPU 12 communicates with the write buffer subsystem 10 over a CPU bus 13, consisting of a CPU address bus 14 and a CPU data bus 16. The write buffer subsystem 10 communicates with main memory 22 over a memory bus 23, consisting of a memory address bus 24 and a memory data bus 26. The memory bus 23 operates under the control of a bus controller 20. The computer system employs RISC techniques, and usually obtains needed instructions and data from a cache (not shown) connected to the CPU 12 over a separate bus (not shown). However, if the needed information is not present in the cache, or if the information is in an uncached segment of memory, or if a data write must be performed, the CPU issues an appropriate memory access request to the write buffer subsystem 10.

If the write buffer subsystem 10 receives a write request (which consists of a address-data pair and some control signals) from the CPU 12, one of several things may occur. If no other write requests are pending in the write buffer subsystem 10, and the bus to main memory 22 is free, the write request is passed after a brief delay to main memory 22 for execution. If no other write requests are pending in the write buffer subsystem 10, but the bus to main memory 22 is busy, the write request is stored in the first rank of an internal write buffer and its availability is indicated to the bus controller 20. The bus controller 20 enables the request onto the memory bus when the bus becomes free and, when the write is complete, acknowledges its use of the information.

If exactly one other write request is pending in the write buffer subsystem 10 when a new request is received, the new request is merely stored in the next available buffer rank. If more than one other write request is pending, the subsystem 10 compares the word address of the incoming request to the word address of the immediately preceding request in the buffer. If there is no match, the new request is written into the current buffer rank. If they do match, the new request is "gathered" into the previous buffer rank with such preceding request. In accordance with the general architecture of the computer, only those bytes of the incoming data which are valid, i.e., intended to overwrite bytes of the addressed word in main memory, overwrite bytes in the buffer ranks. A byte in a buffer rank is left unchanged if the incoming data for that byte is invalid. Thus, if, for example, the incoming write request is a halfword write request to bytes 0 and 1 of a certain word address, and the previous write request was a tribyte write request to bytes 1, 2 and 3 of the same word address, the two requests will be converted to a full word write request and stored in the buffer rank holding the previous request. The data in bytes 0 and 1 will be data contributed by the new write request, and the data in bytes 2 and 3 will be data contributed by the previous request. This has the advantage that not only are requests combined to make use of the full 32-bit bus width to main memory, but a superfluous write to byte 1 of the destination word address is eliminated.

If all but one of the buffer ranks in the write buffer subsystem 10 is full when a write request is received from the CPU 12, there are three possible outcomes: (1) if the bus controller 20 is already acting on the first stored request, the new request will merely be stored in the last buffer rank (or gathered with the request in the previous rank as described above). There is no need to signal Write Buffer Full (WBFULL) to the CPU at this point because the first stored request is about to be emptied; (2) if the bus controller is not already acting on the first stored request, but the word address of the incoming request matches that of the immediately preceeding request, the new request will be gathered with the request in the previous rank as described above. WBFULL will be signalled for one clock cycle due to the time required to detect the match; (3) if the bus controller is not already acting on the first stored request and the word address of the incoming request does not match that of the immediately preceeding request, the new request will be stored in the last available buffer and WBFULL will be signalled. If WBFULL is active when the CPU 12 has a write request ready, the CPU 12 enters a wait state until WBFULL clears.

The write buffer subsystem 10 constantly compares the word address on the CPU address bus 14 with the word address of all pending write requests. If a match is found, a MATCHIN signal is generated which, if it is generated during a read request, puts the CPU 12 in a wait state. The bus controller 20 will then execute pending write requests in the order stored in the buffer ranks until MATCHIN clears. This ensures that a read request from a memory location is never executed until all pending write requests to that location are completed.

A write buffer subsystem according to the invention has been designed and constructed using four gate arrays and a small amount of random logic. The gate arrays divide the subsystem into slices, each slice comprising storage for 8 of the 32 address bits in each of four buffer ranks, 9 of the 36 data bits in each of the four buffer ranks (8 data bits plus one parity bit), as well as counters and additional elements. For simplicity, however, a subsystem according to the invention will be described as if implemented in a single unit.

Figure 2A:
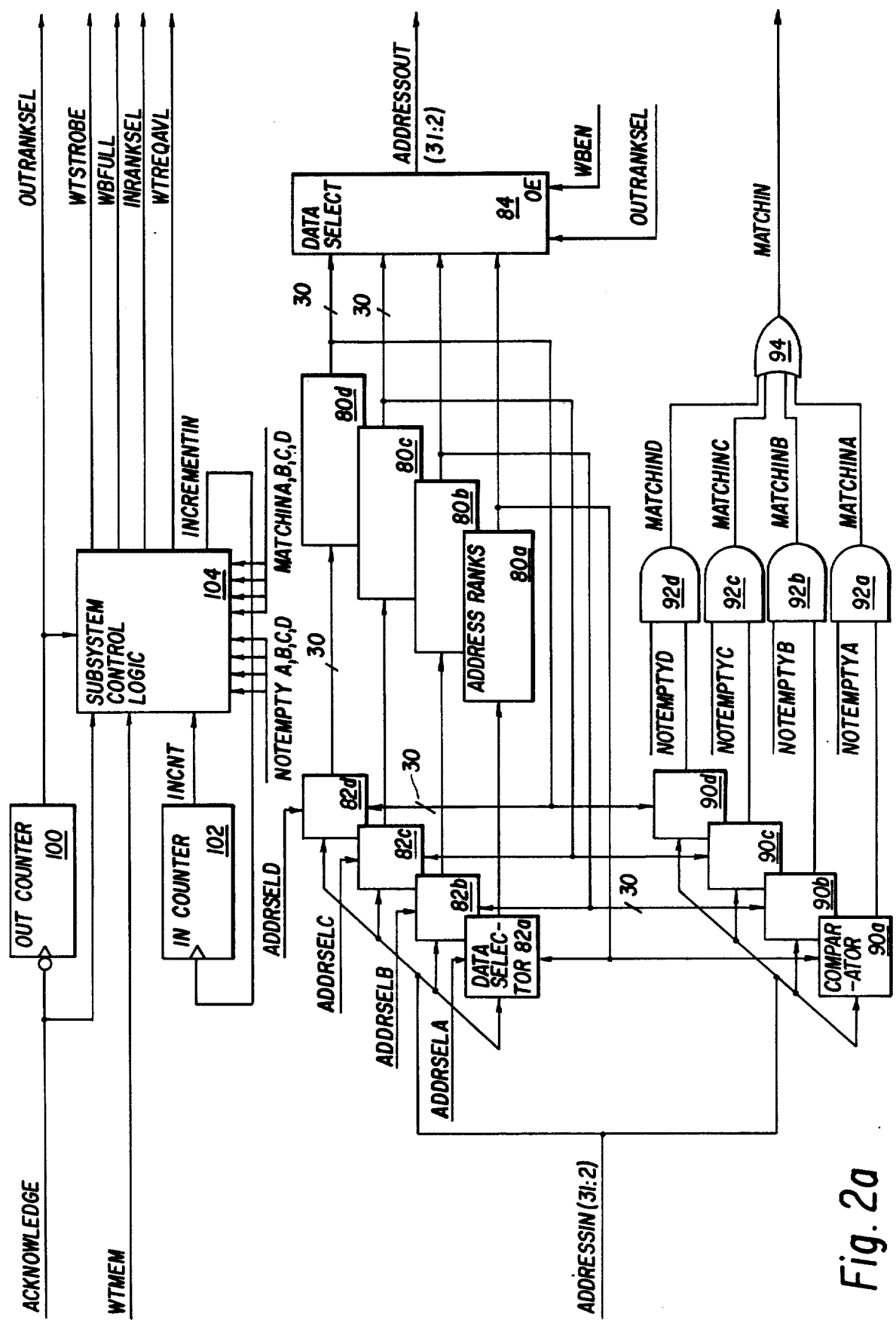
FIGS. 2a and 2b show the write buffer subsystem of FIG. 1 in greater detail.
Figure 2B:
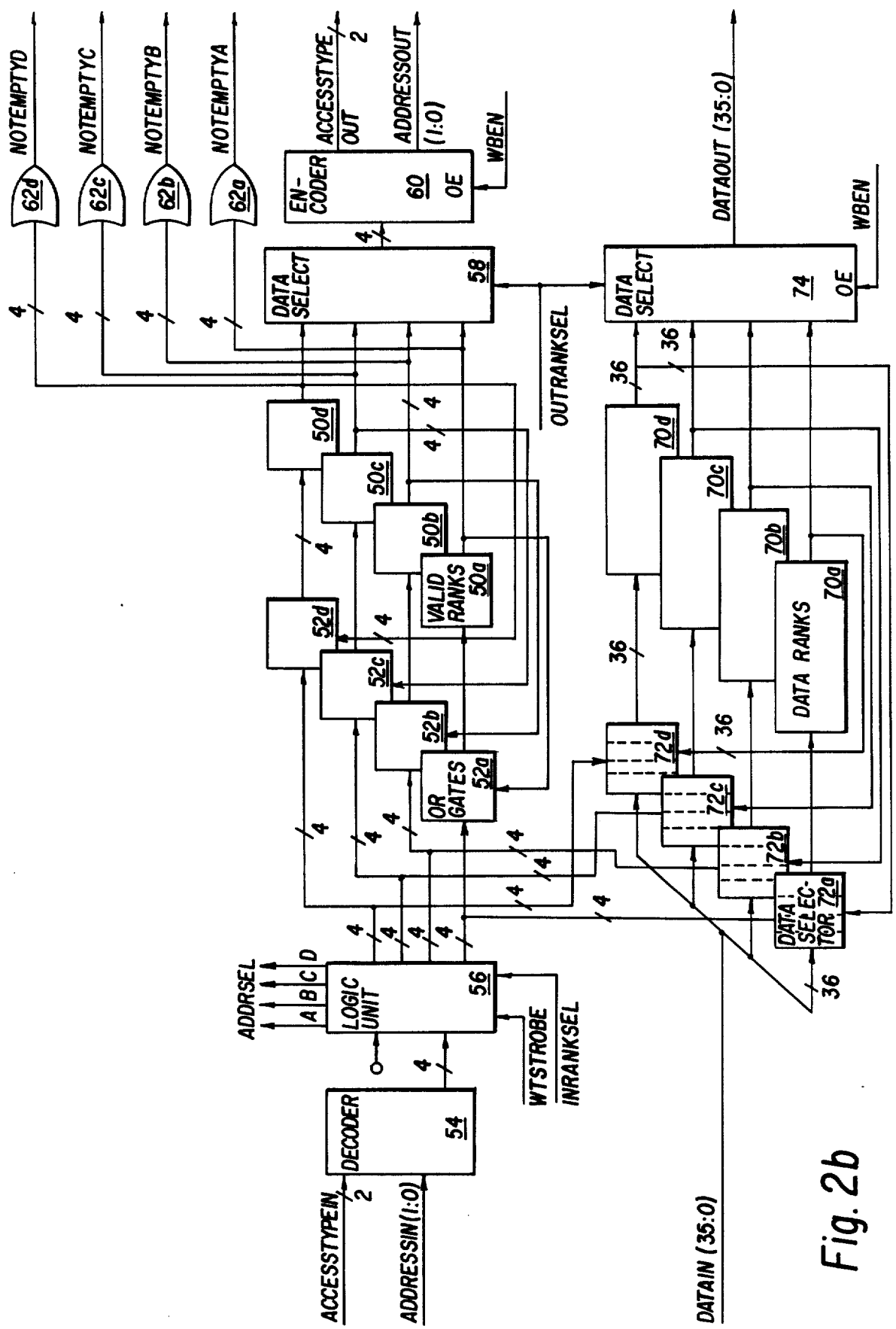

Referring to FIGS. 2a and 2b, the write buffer subsystem 10 showing FIG. 1 will be described in greater detail. It will be seen that the write buffer 10 comprises four buffer ranks, each comprising a data rank 70, a word address rank 80, and a "valid rank" 50. Each of the valid ranks 50a, 50b, 50c and 50d holds four bits of information, each bit indicating whether a corresponding byte in the corresponding data rank is valid. The valid bits are set in accordance with the control signals from the CPU 12 which accompany any write request. The outputs of the valid ranks 50 are fed back to the inputs through OR gates 52a, 52b, 52c and 52d as hereinafter described. The valid ranks 50 are clocked by an ungated clock signal, and as long as the second inputs of OR gates 52 are low, the valid bits will simply recirculate.

The control signals from the CPU 12 include an ACCESSTYPEIN signal, which indicates whether the write request is for writing a byte, half word, tribyte or full word. The ACCESSTYPEIN signal is fed to a decoder 54 which, by further reference to the low order two bits of the address input ADDRESSIN(1:0), generates a four-bit signal indicating which of the four bytes of the incoming data word are to be written. These four bits are fed to a logic unit 56, as is a write strobe WTSTROBE and an input rank select signal INRANKSEL, both to be described hereinafter. In accordance with these signals, at the appropriate time, the logic unit 56 transmits its four-bit input to the four-bit output which corresponds to the buffer rank into which the incoming write request will be stored. Logic unit 56 has 4 such four-bit outputs, one corresponding to each of the buffer ranks in write buffer subsystem 10. The 4 four-bit outputs of logic unit 56 are each fed to the second inputs of the corresponding OR gates 52. Thus, at the appropriate time, when a write request is to be written into a given rank of the write buffer subsystem 10, the four bits indicating the validity of the data bytes already present in that rank are ORed with the four bits indicating the validity of the incoming data, the results being rewritten in to the appropriate valid rank 50. Logic unit 56 also generates four 1-bit signals, ADDRSELA, ADDRSELB, ADDRSELC, and ADDRSELD. These signals are used to write the incoming address into the appropriate address rank, as will be described hereinafter.

The four-bit outputs of all four of the valid ranks 50 are connected to a common data selector 58, which selects the four-bit output corresponding to the buffer rank currently pointed to by a signal OUTRANKSEL, described hereinafter. This selected four-bit signal is fed to an encoder 60, which, when enabled by the bus controller 20 via a signal WBEN, converts the four bits into an ACCESSTYPEOUT signal and the two low order bits of the address output ADDRESSOUT(1:0). The four-bit outputs from each of the valid ranks 50 are also ORed together by OR gates 62a, 62b, 62c and 62d to generate NOTEMPTYA, NOTEMPTYB, NOTEMPTYC and NOTEMPTYD signals indicating that at least one byte of the corresponding data rank contains valid data.

The write buffer subsystem 10 further includes four data ranks 70a, 70b, 70c and 70d, each holding a 36 bit word of data. The outputs of data ranks 70 are fed back to the inputs through data selectors 72a, 72b, 72c and 72d, and, like the valid ranks 50, are continually being clocked by an ungated clock. The second inputs of data selectors 72 are all connected to the CPU data bus 16, represented in FIG. 2b as DATAIN(35:0). Each of the data selectors 72 has four select inputs, one for each 9-bit byte. These select inputs are connected to corresponding ones of the four-bit outputs of logic unit 56. Thus, in the normal situation, the data from the data ranks 70 continually recirculate through data selectors 72. When a write request is received from the CPU 12, at the appropriate time, the data selectors 72 select only those bytes of the incoming data which are valid, for writing into the appropriate data rank 70. The remaining bytes of that data rank 70, as well as all bytes of all the other data ranks 70, are simply recirculated. The outputs of data ranks 70 are also connected to a data selector 74 which, when enabled by the bus controller 20 via the control line WBEN, outputs onto the memory data bus 26 the data word in the buffer rank selected by OUTRANKSEL.

Referring now to FIG. 2a, it will be seen that the write buffer subsystem 10 further includes four address ranks 80a, 80b, 80c and 80d. These address ranks hold only the word address for each write request, constituting the high order 30 bits. Like the data ranks 70, the information in the address ranks 80 are recirculated back to the inputs on each cycle of an ungated clock through respective data selectors 82a, 82b, 82c and 82d. Unlike data selectors 72, however, data selectors 82 can select only a full one of their 30-bit inputs. The second inputs of data selectors 82 are all connected to the high order 30 bits of the CPU address bus 14 ADDRESSIN(31:2). The select inputs of the data selectors 82 are connected respectively to ADDRSELA, ADDRSELB, ADDRSELC, and ADDRSELD. The address information in the address ranks 80 is therefore recirculated except when a write request is being written into the write buffer subsystem 10, in which case the contents of only the address rank pointed to by INRANKSEL is overwritten by the incoming address signal. The 30-bit outputs of address ranks 80 are also connected to a data selector 84 which, when enabled by the bus controller 20 via the signal WBEN, outputs onto the memory address bus 24 the word address in the buffer rank 22 pointed to by OUTRANKSEL.

The outputs of the address ranks 80 are further connected to the first inputs of respective comparators 90a, 90b, 90c and 90d. The second inputs of the comparators 90 are connected to the incoming address signal ADDRESSIN(31:2). The outputs of comparators 90, which indicate equality only, are gated by the signals NOTEMPTYA, NOTEMPTYB, NOTEMPTYC and NOTEMPTYD via AND gates 92a, 92b, 92c and 92d, to generate signals MATCHINA, MATCHINB, MATCHINC and MATCHIND, respectively. The latter signals indicate that the incoming word address signal matches the word address in a corresponding buffer rank. The signals are gated by the NOTEMPTY signals in order to prevent activation of any of the MATCHIN: signals based on a stored word address which has already been written to main memory 22 by the bus controller. The signals MATCHINA, MATCHINB, MATCHINC and MATCHIND are additionally ORed together by OR gate 94 to generate a composite MATCHIN signal. This signal indicates that the incoming word address matches at least one of the valid stored word addresses and is used for read requests from CPU 12 as described previously.

The write buffer subsystem 10 further includes an OUT counter 100 for keeping track of the buffer rank from which the bus controller 20 will take the next write request; and an IN counter 102, for keeping track of the next buffer rank available for a new incoming write request from the CPU 12. The OUT counter 100 is incremented by the clock signal in the presence of an ACKNOWLEDGE signal generated by the bus controller 20, and generates OUTRANKSEL as an output. ACKNOWLEDGE is also connected to subsystem control logic 104, which has additional inputs connected to OUTRANKSEL, WTMEM (the signal from the CPU 12 indicating that a write request has been placed on the CPU bus 13), INCNT (the output of IN counter 102), NOTEMPTYA, NOTEMPTYB, NOTEMPTYC and NOTEMPTYD, and MATCHINA, MATCHINB, MATCHINC and MATCHIND. Subsystem control logic 104 generates control systems for the write buffer subsystem 10 as follows:

WTREQAVL, which indicates to the bus controller 20 that a write request is pending and available for execution, is active whenever any of the NOTEMPTYi are active.

INRANKSEL, which is used within write buffer subsystem 10 to indicate the buffer rank into which an incoming write request is to be stored or gathered, is set equal to INCNT if (1) INCNT equals OUTRANKSEL+1, or (2) MATCHINi for buffer rank INCNT−1 is inactive; it is set equal to INCNT−1 if INCNT is different from OUTRANKSEL+1 and MATCHINi for buffer rank INCNT−1 is active. INCREMENTIN, which is connected to the clock input of in counter 102, is clocked in response to WTMEM. Clocking occurs, however, only if (1) INCNT equals OUTRANKSEL+1, or (2) MATCHINi for buffer rank INCNT−1 is inactive.

WBFULL, which signals to the CPU 12 that the write buffer subsystem 10 is full and can accept no more writes, is active (1) if all of the NOTEMPTYi are active, or (2) in response to WTMEM if (a) three of the NOTEMPTYi are active and (b) ACKNOWLEDGE is inactive.

WTSTROBE, which is a timing signal used within write buffer subsystem 10 to effect buffer storage of an incoming write request, responds after an appropriate delay to WTMEM.

The operation of the write buffer subsystem shown in FIGS. 2a and 2b will now be described. On power-up, all the bits in the valid ranks 50 are cleared to indicate that no write request is currently available to the bus controller 20 for execution. The OUT counter 100 and the IN counter 102 are also both set to zero, an inactive WTREQAVL signal is generated. When no write request is being received from the CPU 12 (i.e., WTMEM is inactive), the information in the valid ranks 50, the data ranks 70 and the address ranks 80 recirculate unchanged. The information in the valid ranks 50 pass through OR gates 52, but since WTSTROBE remains inactive, the second inputs of OR gates 52 remain low. Similarly, for the same reason, data selectors 72 (through which the recirculating data information passes) and 82 (through which the recirculating address information passes) continue to select for input to the buffer ranks the recirculating information rather than information on the CPU data and address buses 16 and 14.

When the CPU 12 signals a write request by activating WTMEM, WTSTROBE is activated at the appropriate time to cause the incoming write request to be written into buffer rank a. Buffer rank a is chosen because the IN counter is pointing to buffer rank a, and since all the valid bits of the previous buffer rank (rank d) are inactive, so is NOTEMPTYD. This forces MATCHIND to be inactivated via AND gate 92d, which causes the subsystem control logic 104 to set INRANKSEL equal to the output of the IN counter 102.

The actual writing takes place because WTSTROBE has been activated by WTMEM. This causes the logic unit 56 to turn on ADDRSELA for one clock cycle so that the word address on the CPU address bus 14 is selected by data selector 82a and stored in address rank 80a. WTSTROBE also causes the logic unit 56 to turn on appropriate ones of its 4-bit output corresponding to buffer rank a, for one clock cycle. For example, assuming the reference is a full word write, and ACCESSTYPEIN so indicates, then all four of such bits will be activated. These will be ORed with the information already in valid rank 50a via OR gate 52a, but since "1" OR anything is "1", all four bits of valid rank 50a will set. (It will be apparent that the function of the OR gates 52 could also be accomplished by using JK flip flops for the valid ranks 50). Similarly, the four-bit output of logic unit 56 corresponding to rank a will cause data selector 72a to select the data on the CPU data bus 16, for one clock cycle, for all four bytes, for storage into data rank 70a.

When WTMEM returns to its inactive state, IN counter 102 is incremented so that it now points to buffer rank b. Since NOTEMPTYA is now active, WTREQAVL is activated to indicate to the bus controller 20 that a write request is pending in one of the buffer ranks. It will be assumed for purposes of this illustration, however, that the bus controller 20 does not yet act on this request.

When WTMEM is again activated by the CPU 12, indicating the presence of a second write request, the information is written into buffer rank b in the manner just described. Buffer rank b is chosen because IN counter 102 is pointing to buffer rank b, which is one higher than the buffer rank pointed to by OUTRANKSEL. Subsystem control logic 104 therefore sets INRANKSEL equal to INCNT (which points to buffer rank b) regardless of any match between the incoming word address and the word address in any of the buffer ranks. For purposes of this illustration, it is assumed that this second write request is a write request to bytes 1, 2, and 3 of a given word address and ACCESSTYPEIN and ADDRESSIN(1:0) so indicate. Logic unit 56 therefore turns on only bits 1, 2 and 3 of its four-bit output corresponding to buffer rank b, leaving bit 0 inactive. Through OR gates 52b, bytes 1, 2 and 3 of valid rank 50b will be set, and bit 0 of valid rank 50b will remain unset. Similarly, through data selector 72b, bytes 1, 2 and 3 of data rank 70b will be overwritten by bytes 1, 2 and 3 of the incoming data on the CPU data bus 16. Byte 0 of data rank 70b remains unchanged, and because it has not been changed since power-up, contains random information. When WTMEM returns to its inactive state, IN counter 102 is incremented once again and WTREQAVL remains in its active state. It is assumed once again that the bus controller 20 does not empty any of the buffer ranks at this point.

When WTMEM becomes active a third time, indicating the presence of yet another write request on the CPU bus 13, the information is written into either buffer rank c or buffer rank b depending on whether the incoming word address matches the word address stored in buffer rank b. If it does not, the MATCHINB signal will be inactive.

Subsystem control logic 104 will therefore set INRANKSEL equal to the output of IN counter 102, which is currently pointing to buffer rank c. If the incoming word address does match the word address in buffer rank b, the MATCHINB signal will so indicate. Since INCNT is no longer pointing to the buffer rank immediately above OUTRANKSEL (which still points to buffer rank a), subsystem control logic 104 will set INRANKSEL equal to the buffer rank just below that pointed to by IN counter 102. The incoming information will therefore be written into buffer rank b.

For purposes of this illustration, it is assumed that the incoming write request is a halfword write to bytes 0 and 1, and its word address does match that in buffer rank b. As with the previous write request, the incoming word address will be written into the address rank 80b corresponding to the buffer rank pointed to by INRANKSEL. Logic unit 56 will generate a four-bit output for buffer rank b, in which bits 0 and 1 will be active and bits 2 and 3 inactive. These bits are ORed by OR gates 52b with the valid bits already in valid rank 50b, turning on bit 0 (which was previously off), turning on bit 1 (which was already on), and leaving bits 2 and 3 in their previous (on) state. All four bits of valid rank 50b are therefore now set. Similarly, data selector 72b will select bytes 0 and 1 from the incoming data and bytes 2 and 3 from the recirculating data, for storage in data rank 70b. The random data in byte 0 will have been overwritten with byte 0 of the incoming data, the previous data in byte 1 of data rank 70b will have been overwritten with byte 1 of the incoming data, and bytes 2 and 3 of the previous data in data rank 70b will remain unchanged. When WTMEM returns to its inactive state, IN counter 102 is not incremented because (1) it is not currently pointing to the buffer rank immediately above that pointed to by OUTRANKSEL, and (2) MATCHINB was active.

When bus controller 20 is ready to execute a pending write request, it activates the ACKNOWLEDGE signal and the WBEN signal. Since OUTRANKSEL is pointing to buffer rank a, data selectors 74 and 84 select the data and word address respectively, from data rank 70a and address rank 80a. At the same time, the valid bits from valid rank a are selected by data selector 58 and presented to the encoder 60. Since all four valid bits were active, the encoder 60 determines that the write request in buffer rank a is for an entire word, and sets ACCESSTYPEOUT accordingly. It also sets the low order two address bits ADDRESSOUT(1:0) to 0, correspondingly. When the write request is completed, the bus controller 20 deactivates the ACKNOWLEDGE signal, thereby causing OUTRANKSEL to increment so that it now points to buffer rank b.

When bus controller 20 is ready to execute the next write request pending in the write buffer subsystem 10, it again activates ACKNOWLEDGE and WBEN. Now, since OUTRANKSEL is pointing to buffer rank b, the word address and data from buffer rank b are selected by data selectors 74 and 84 and enable onto the memory bus 23. In accordance with the invention, all the valid bits in valid rank b are active. As explained previously, this represents a combination of two different write requests to overlapping groups of bytes in the same word address. The write buffer subsystem 10, therefore, has effectively reduced the number of write requests which must be handled by bus controller 20 and main memory 22 by one. As mentioned previously, a superfluous write to byte 1 of the addressed word has been eliminated as well. It should be noted that the main memory subsystem may not be capable of executing a write request to two discontiguous bytes in a word. If so, two bus cycles may be required to empty a buffer rank which has valid data bytes in, for example, positions 0 and 3 only. Additional circuitry will be required to handle this. An advantage still obtains, however, because fewer buffer ranks are required to store the same number of write requests.

The invention has been described with respect to particular embodiments thereof, and it will be understood that numerous variations are possible within the scope of the invention. For example, although the above-described embodiment does not permit gathering of an incoming write request with any request other than the immediately preceeding request, a system may be design which does permit such gathering. Additionally, although the above-described embodiment does not permit gathering of an incoming write request with the request currently pointed to by the OUT counter, a system may be designed which does permit that in certain circumstances. Finally, although in the above-described embodiment write requests are generated by a CPU and data is written to memory, the invention is equally applicable to systems in which the write requests are generated by another peripheral device and the data is written to another output device. These and other variations are all intended to be within the scope of the invention.

What is claimed is:

1. Apparatus for buffering write requests to an output device, each write request having associated therewith data and an address, comprising:

a first buffer rank;

a second buffer rank different from the first buffer rank;

means for writing a first one of the write requests into the first buffer rank;

means for writing a second one of the write requests into the first buffer rank if the first buffer rank is empty;

means for writing the second one of the write requests into the second buffer rank if the first buffer rank is non-empty and the address associated with the first one of the write requests does not match the address associated with the second one of the write requests; and means for gathering the second one of the write requests with the first one of the write requests in the first buffer rank if the address associated with the second one of the write requests matches the address associated with the first one of the write requests and the first buffer rank is non-empty, wherein the means for gathering the second one of the write requests with the first one of the write requests in the first buffer rank comprises means for writing into the first buffer rank only those bits of the data associated with the second write request which are intended to be written to the output device.

2. Apparatus for buffering write requests to an output device, each write request having associated therewith a data word, a word address, and a valid signal for pointing to those bits of the data word which are to be written to the output device, comprising:
- a plurality of buffer ranks, each buffer rank comprising a data register for holding a data word, an address register for holding the word address to which data from the data word is to be written, and a valid register for pointing to the bits of the data register which are to be written, the buffer rank being considered empty if the valid register points to none of the bits of the data register and non-empty if the valid register points to at least one of the bits of the data register;
- means for writing the word address of a first incoming write request into the address register of a first input one of the buffer ranks;
- means for writing into the data register of the first input one of the buffer ranks only those bits of the data word of the first incoming write request which are pointed to by the valid signal of the first incoming write request; and
- means for altering the contents of the valid register of the first input one of the buffer ranks so as to point to the bits pointed to by the valid signal of the first incoming write request as well as the bits pointed to by the valid register immediately before activation of the means for altering.

3. Apparatus according to claim 2, further comprising:
- means for emptying an output one of the buffer ranks and altering the valid register of the output one of the buffer ranks so as to point to none of the bits of the data register of the output one of the buffer ranks;
- wherein the first input one of the buffer ranks is chosen to be a non-empty buffer rank the address register of which holds a word address which matches the word address of the first incoming write request, or, if the address register of none of the non-empty buffer ranks holds a word address which matches the word address of the first incoming write request, an empty buffer rank.

4. Apparatus according to claim 2, further comprising:
- means for emptying an output one of the buffer ranks and altering the valid register of the output one of the buffer ranks so as to point to none of the bits of the data register of the output one of the buffer ranks;
- wherein the first input one of the buffer ranks is chosen to be a non-empty buffer rank different from the output one of the buffer ranks, the address register of which holds a word address which matches the word address of the first incoming write request, or, if the address register of none of the non-empty buffer ranks different from the output one of the buffer ranks holds a word address which matches the word address of the first incoming write request, an empty buffer rank.

5. Apparatus according to claim 2 further comprising: means for emptying an output one of the buffer ranks and altering the valid register of the output one of the buffer ranks so as to point to none of the bits of the data register of the output one of the buffer ranks;

- means for writing the word address of a second incoming write request into the address register of a second input one of the buffer ranks, the second incoming write request following the first incoming write request without any intervening write requests;
- means for writing into the data register of the second input one of the buffer ranks only those bits of the data word of the second incoming write request which are pointed to by the valid signal of the second incoming write request; and
- means for altering the contents of the valid register of the second input one of the buffer ranks so as to point to the bits pointed to by the valid signal of the second incoming write request as well as the bits pointed to by the valid register of the second input one of the buffer ranks immediately before activation of the means for altering;
- wherein the second input one of the buffer ranks is chosen to be the first input one of the buffer ranks if the word address of the second incoming write request matches the word address of the first incoming write request and the first input one of the buffer ranks is non-empty, or, if the word address of the second incoming write request does not match the word address of the first incoming write request, or if the first input one of the buffer ranks is empty, an empty buffer rank.

6. Apparatus for buffering write requests to an output device, each write request comprising a data word, a destination address and a valid signal indicating which bits of the destination address of such write request are to receive data form the data word of such write request, comprising:
- a buffer capable of storing at least two write requests;
- means for removing write requests from the buffer;
- means for gathering an incoming write request with a previous write request in the buffer, which previous write request has not been removed and the destination address for which previous write request matches the destination address of the incoming write request, wherein the means for gathering an incoming write request with a previous write request in the buffer, which write request has not been removed, comprises means for generating a resulting write request in which:
  - (a) those bits of the destination address of the resulting write request which, according to the valid signal of the incoming write request, are to received data from the data word of the incoming write request, are indicated by the resulting write request to received data from the data word of the incoming write request; and
  - (b) those bits of the destination address of the resulting write request which, according to the valid signal of the previous write request, are to receive data from the data word of the previous write request, and which, according to the valid signal of the incoming write request, are not also to receive data from the data word of the incoming write request, are indicated by the resulting write request to receive data from the data word of the previous write request; and
- means for storing the incoming write request in the buffer if the destination address of the incoming write request does not match the destination address of any write request in the buffer, which write request has not been removed.

7. Apparatus according to claim 6, wherein the means for gathering further comprises means for overwriting the previous write request with the resulting write request.

8. Apparatus for buffering write requests to an output device, each write request comprising a data word including several data bytes and a destination address, comprising:

a buffer capable of storing at least two write requests;

means for removing write requests from the buffer, including means for pointing to the next write request to be removed from the buffer;

means for gathering a incoming write request with a previous write request in the buffer, which previous write request has not been removed, is not pointed to by the means for pointing, and the destination address of which previous write request matches the destination address of the incoming write request by overlapping bytes of the incoming write request with bytes of the previous write request; and means for storing the incoming write request in the buffer if the destination address of the incoming write request does not match the destination address of any write request in the buffer, which write request has not been removed.

9. Apparatus for buffering write requests to an output device, each write request comprising a data word including several bytes and a destination address, comprising:

a buffer capable of storing at least two write requests;

means for removing write requests from the buffer;

means for gathering an incoming write request with a preceding write request if such immediately preceding write request has not been removed and the destination address of such immediately preceding write request matches the destination address of the incoming write request by overwriting bytes of the preceding write request with bytes of the incoming write request; and means for storing the incoming write request in the buffer if the destination address of the incoming write request does not match the destination address of the immediately preceding write request or if such immediately preceding write request has been removed.

* * * * *